July 4, 1967     HORST-EGON WACH     3,329,250

OVERLOAD SAFETY DEVICE FOR PRESSES

Filed Aug. 31, 1965     3 Sheets-Sheet 1

Inventor:
Horst-Egon WACH
By: Nolte & Nolte
ATTORNEYS

July 4, 1967 HORST-EGON WACH 3,329,250
OVERLOAD SAFETY DEVICE FOR PRESSES
Filed Aug. 31, 1965 3 Sheets-Sheet 2

Inventor:
Horst-Egon WACH
By: Nolte & Nolte
ATTORNEYS

United States Patent Office 3,329,250
Patented July 4, 1967

3,329,250
OVERLOAD SAFETY DEVICE FOR PRESSES
Horst-Egon Wach, Waldstetten, Germany, assignor to May-Pressenbau GmbH, Schwabisch Gmund, Germany
Filed Aug. 31, 1965, Ser. No. 483,917
Claims priority, application Germany, Mar. 2, 1965, M 64,366
17 Claims. (Cl. 192—150)

This invention relates to a hydraulic overload safety device for presses.

Overload safety devices for presses are known in which the force is transmitted through a high pressure oil cushion from the drive mechanism of the press to the work tool. When the stress on the press exceeds the permissible value due to overloading, the oil pressure in the oil cushion increases. To avoid a further increase of the stress which would damage the machine, the pressure in the oil cushion must be rapidly reduced. In one known structure, this is done by a spring loaded relief valve, or in another known device, the oil cushion limiting piston is supported by a piston ring. During overloading, the piston lifts and releases almost the total transverse section of the piston to drain the oil.

This construction avoids the disadvantages of spring-loaded relief valves, but requires a further fill-up valve in its high pressure circuit, which prevents an outflow of hydraulic fluid when the pressure chamber is filled up. Furthermore, it is difficult to obtain a satisfactory seal between the piston and the gasket ring being installed in the plunger, since the pressure in the pressure chamber could very often exceed a pressure of 100 atmospheres and could increase to above 600 atmospheres. Even if this gasket leaks only slightly, the overload safety device is actuated and the press is rendered inoperative.

According to the invention, these disadvantages are overcome in that the piston is arranged as a low pressure piston. A high pressure piston is operatively connected with the low pressure piston axially thereof and moving in the same operating direction. The high pressure piston extends into a sealed pressure chamber. The hydraulic fluid in the pressure chamber transmits the greater portion of the force from the operating mechanism to the plunger housing and only a fraction of this force to the high pressure chamber. The further advantages of this construction are that the pressure chamber is a sealed off space from which liquid cannot flow out either during normal operation of the press or after the actuation of the safety device. With this arrangement it is possible to seal the pressure chamber in such a manner that leakage of liquid to the outside is practically impossible. Furthermore, the relief valve of known constructions is eliminated.

A further advantage of the inventive construction lies in the fact that only the low pressure piston must be radially sealed with respect to the plunger, which is simple under normal conditions. Since the low pressure chamber may be connected to an efficient low pressure pump, a small loss of oil due to leakage would be of no significance, as the drained oil is constantly replenished from the pump.

A still further advantage of the inventive construction is that the transverse surface area of the high pressure piston may be made relatively small, so that the active face of the low pressure pump piston is also small. Through this arrangement the volume of the pressure chamber, which is to be filled with low pressure fluid, can be kept small. The low pressure chamber may be filled from a low pressure source.

Since, with certain types of mechanical presses, high pressure is present at the transverse section of the plunger, the hydraulic fluid chambers are relatively small, so that the resulting pressure in this chamber during, normal operation, is relatively high and, as previously mentioned, could be up to 600 atmospheres or higher. With this construction the advantages of the inventive structure are especially apparent, because even at this high pressure, the slidable sealing of the inventive structure can be readily achieved. The pressure transmission from the press to the relatively small area of the plunger is easily controllable.

It is possible, to arrange the low pressure piston and the high pressure piston separately, or to operatively connect them in the direction of their movement. However, an especially stable and reliable structure is provided when both pistons are constructed from one piece as in a preferred embodiment according to the invention.

A small leak of the low pressure piston gasket can be replenished without any difficulties by low pressure liquid from the low pressure source, so that even at a slight leak the press and the overload safety device thereof operate satisfactorily.

According to the invention, the press is preferably switched off during a pressure loss in the high pressure chamber which loss effects movement of a differential piston. The movement of the differential piston serves to actuate a switch assembly. For this purpose, an actuating member such as a pin is provided in the path of movement of the differential piston, which actuates the switch assembly.

For certain applications the invention provides the possibility to construct the overload safety device separate from the plunger. In this case, one portion, for instance, the body of the overload safety device will be rigidly secured to the plunger, while the tool support operates another portion movably arranged relative to the body.

The various features of novelty which characterize the invention are pointed out with particularity in the claims annexed to and forming a part of this specification. For a better understanding of the invention, its operating advantages and the specific objects obtained by its use, reference should be had to the accompanying drawings and descriptive matter in which:

Figure 1:
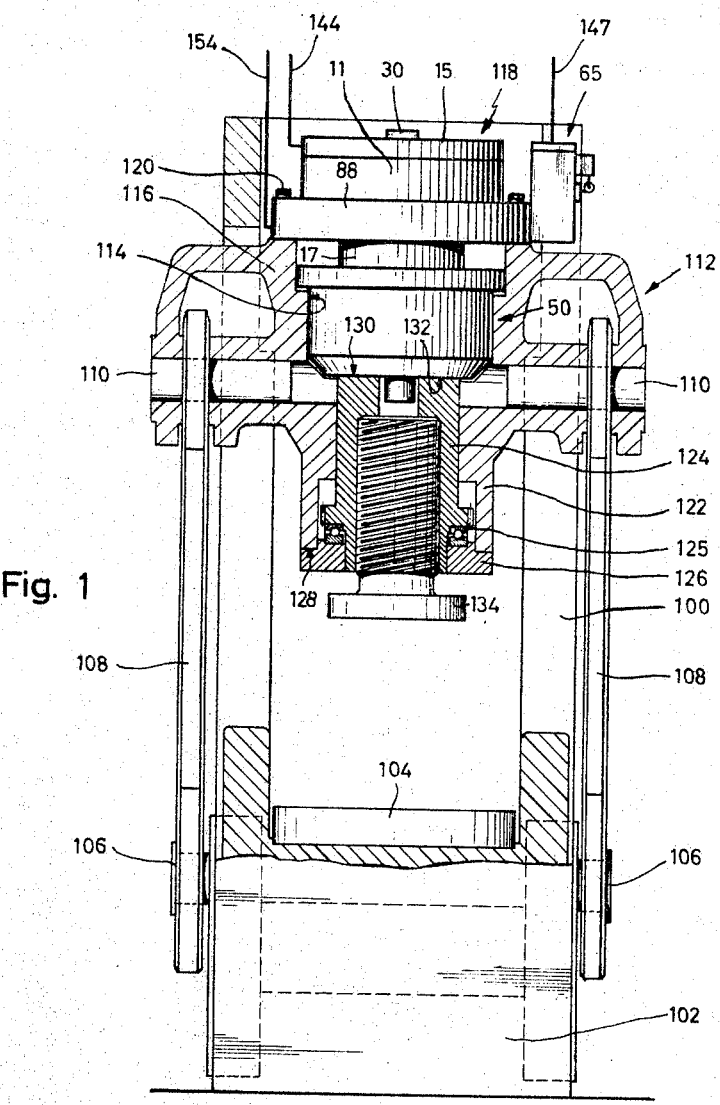
FIG. 1 shows a sectional front view of a toggle lever press together with the overload safety device according to this invention.

In FIG. 1, a press frame 100 is shown having a lower portion 102 in which a crank drive is mounted in brackets (not shown). This drive is well known in the art and is therefore not more fully described here. A work support 104 is mounted on this lower frame portion. Driving rods 108 are actuated about trunnions 106 which are pivotably mounted on plunger pins 110 and plunger 112.

In an upper part of 116 of the plunger, a horizontal recess 114 which is open towards the top is provided. An overload safety device 118 is arranged within recess 114 and secured by means of screws 120 to the upper part 116 of the plunger. A lower part 122 is provided adjacent to upper part 116 of the plunger. A casing 124, is rotatably and longitudinally movable in their lower part and is supported by an annular flange 126 and a pressure bearing 125. The annular flange is mounted on a face 128 of lower part 122 of plunger 112. Casing 124 engages with an upper annular face 130 thereof a lower face 132 of overload safety device 118. A tool support 134 is threaded into casing 124. According to the above description it is apparent that the operating pressure is effective from work support 104 through the work piece to casing 124 and to overload safety device 118. The overload safety device is actuated after a predetermined pressure maximum has been exceeded.

The hydraulic system for the overload safety device will now be described with reference to FIGS. 2 and 3, in which similar reference characters represent similar elements in the drawings.

The body of overload safety device 118 generally designated as 10, has a main portion 11 which is provided with a chamber 12, whereby the upper portion of the chamber is covered by a lid 15 secured to main portion 11 by screw 16. At the lower part of main portion 11 is a cylinder 17 which supports for reciprocation a high pressure piston 20 of a piston device generally designated as 22. The high pressure piston is sealed off against cylinder 17 by a piston ring 23 and is held in its position by an annular holder 25.

High pressure piston 20 is rigidly connected to a low pressure piston 28 by means of a connecting piece 26. A projection 30 of the low pressure piston 28 slides within an opening 32 of lid 15. The projection is sealed off against the wall of opening 32 by means of a sealing gasket 34.

An annular piston ring 40 is provided at the lower portion of low pressure piston 28. Sealing ring 40 is supported by an annular disc 41 which in turn is arranged at the bottom of chamber 12. A conduit 42 is provided in lid 15 which leads to the outside of chamber 12. Furthermore, a channel 44 is provided which leads to the outside from a chamber 45 located below the low pressure piston.

A cup-shaped member 50 is movably arranged on cylinder 17, comprising a circumferential portion 51 and a bottom 52 through which a projection 55 of the piston device extends. The projection is sealed off against the bottom by means of a sealing ring 56. This sealing ring is held in its position by an annular holder 57. For sealing the circumferential portion 51 of the member 50 against cylinder 17 a sealing ring 58 is provided in the latter and is supported by an annular holder 59.

Cup-shaped member 50, cylinder 17, and high pressure piston 20 form the high pressure chamber 60 which is connected by means of a conduit 62 with the high pressure chamber 64 of a differential piston device 65, which is secured to main portion 11 by means not shown. The end of conduit 62 which leads to the atmosphere is closed by a plug 62a.

The differential piston device comprises a housing 70 in which aside from high pressure chamber 64 a low pressure chamber 72 is arranged. A differential piston 74 is movably mounted in the high pressure chamber with its associated high pressure portion and in the low pressure chamber with its associated low pressure portion. Since the construction of a differential piston as such is known, a detailed description of same will be omitted. The upper part of housing 70 is closed by a cover 77 comprising a supply channel 78.

A switching pin 80 extends into the low pressure chamber and is held in its position by a spring 81. For switching off the press, switching pin 80 actuates a switching element of switch 85. The overload safety device is secured, as already mentioned, on the upper part of the plunger by means of screws 120. Screws 120 extend through an annular flange 88 of main portion 11 and force flange 88 against an upper surface 89 of the plunger. Furthermore, cup-shaped member 50 is provided with an outer annular shoulder 90.

In the following, the operation of the hydraulic system of the overload safety device will be described with reference to FIG. 2. A low pressure pump 140 is actuated by a motor 142, whereby a vacuum pipe 152 is connected to an oil supply tank 150. A pressure regulating valve 160 together with a return pipe 158 is connected to pump 140. Furthermore, a low pressure pipe 144 is connected to the pump and communicates with low pressure chamber 12 via channel 42. Pressure lines 146 and 147 are connected to the pump by a three-way valve 148 and channel 78 with low pressure chamber 72 of the differential piston. A pipe 156 extends from the three way valve 148 to oil supply tank 150. A pipe 154 together with channel 44 connects chamber 45 and oil supply tank 150. The following is a detailed description of the overload safety device in accordance with the invention.

Figure 2:
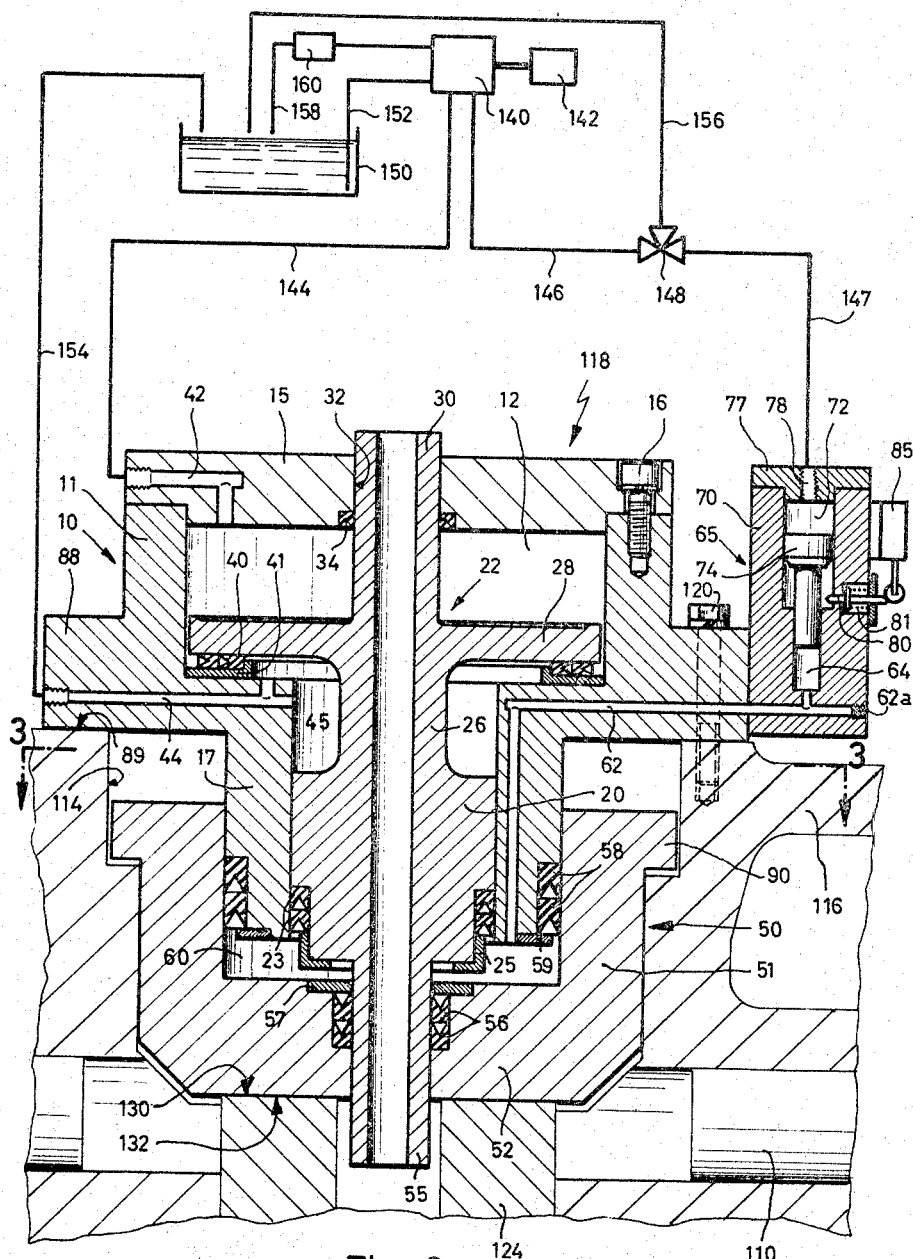
FIG. 2 is an exploded longitudinal sectional view of the overload safety device shown in FIG. 1.
Figure 3:
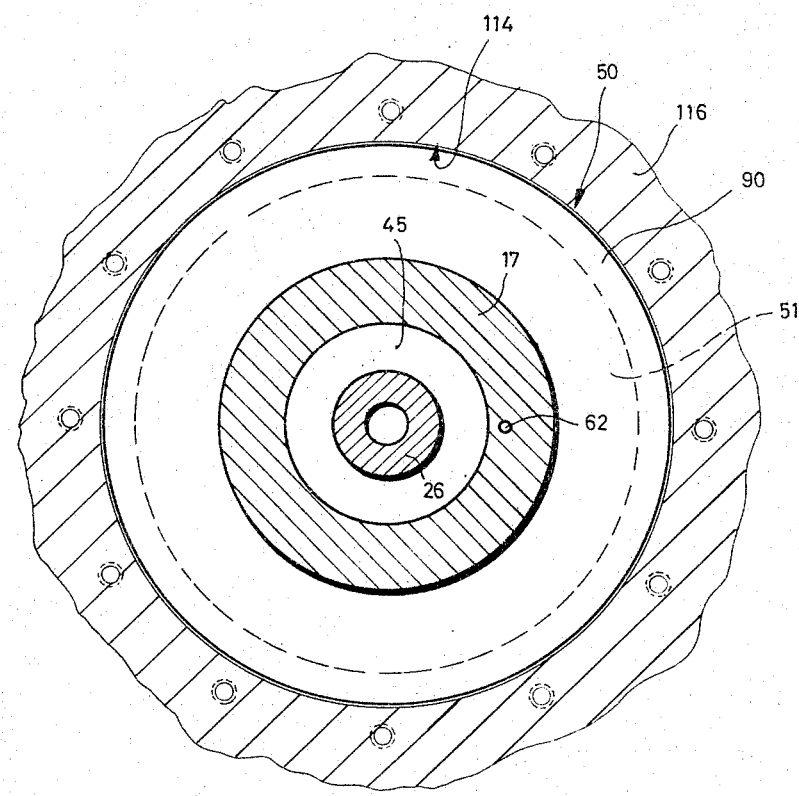
FIG. 3 is a sectional view taken along line 3—3 of FIG. 2.

In FIG. 2 the overload safety device is shown with running pump 140 so that low pressure is present in low pressure chamber 12, via pipe 144 whereby low pressure piston 28 is pressed with its sealing ring 40 against piston ring 41. Furthermore, a low pressure is present in the low pressure chamber of the differential piston device via pipe 146 so that a corresponding high pressure is present in high pressure chamber 64 and in high pressure chamber 60. According to FIG. 2, cup-shaped member 50 is thereby forced downwardly against surface 130 of casing 124. The upwardly directed stress will be absorbed by body 10 which is rigidly secured to the upper part of the plunger and also by piston device 22, which is held in its position by the low pressure as shown in FIG. 2.

If the stress applied on the tool support and thereby on casing 124 and cup-shaped member 50 exceeds a certain value during operation of the press, high pressure piston 20 will be forced upwardly. Thereby, low pressure piston 28 becomes separated from its sealing so that low pressure chamber 12 is without any pressure. That means, that the whole piston device can move upwardly in a relatively rapid manner. Thereby, the high pressure chamber 60 is practically without pressure, and differential piston 74 moves downwardly into the low pressure chamber under the action of the lower pressure, whereby the differential piston engages switching pin 80 and moves the pin to the right to actuate element 85 which stops the press.

When the pressure of the tool support subsides, that is, when the plunger lifts from the workpiece, the piston device is moved into the position shown in the drawings. Then the press is rendered operative partly under the own weight of the piston device, but in any case under the action of the low pressure fluid, which is pumped into lower pressure chamber 12 by pump 140. Before this pumping performance, valve 148 is reversed, whereby chamber 72 of differential piston device 65 is rendered without pressure via channel 78 and pipes 147 and 156. The differential piston is pressed upwardly and thereby disengages from switching pin 80 so that the pump is automatically actuated. As soon as the low pressure chamber 12 is sealed again, and piston device 22 resumes the position shown in FIG. 2, valve 148 again will be reversed to connect pipes 146 and 147. High pressure chamber 60 is again under high pressure exerted by the differential piston device.

With this inventive construction it should be especially noted that the high pressure chamber is completely closed so that regulating valves are eliminated. There is no loss of liquid and therefore no liquid has to be added at a later stage of the operation.

The sealings to be used for sealing the high pressure chamber should be preferably sealings which are suited for continuous operation and which do not permit leaking. In the embodiment, lip packings have been used which have proven advantageous under working conditions.

It is emphasized that with the structure of the invention the excessive pressure is relieved irrespective of the operation of the switch 85. It will be seen that when the high pressure piston 20 is displaced upwardly, as viewed in FIG. 2, with respect to the cylinder 17, the low pressure chamber 12 is immediately relieved of its pressure because of the movement of the low pressure piston 28 away from the seal 40, thus permitting the fluid on both sides of the piston 28 to communicate with the conduit 154 which is only at atmospheric pressure. As is shown in FIG. 2 there is around the periphery of the piston 28 a sufficient clearance to place the part of the chamber 12 which is above the piston 28 in communication with the part of the chamber 12 which is below the piston 28 when the latter is displaced upwardly from the sealing rings 40, so that in this way the entire chamber 12 all the way down to the high pressure piston 20 is relieved of pressure as soon as the piston 28 is displaced upwardly from its position shown in FIG. 2. The result is that the high pressure chamber 60 is also immediately relieved of pressure so that the entire press becomes relieved of pressure, and this action is achieved without the differential assembly 65 or the switch 85. It is only as a matter of convenience that the machine is turned off by way of the switch 85 and the differential assembly 65. Even without the units 65 and 85 the press would be entirely relieved of pressure because of the immediate placing of the low pressure chamber 12 at atmospheric pressure as soon as the high pressure piston 20 is displaced upwardly from its operative position shown in FIG. 2. Thus, the low pressure chamber 12 and the low pressure piston 28 therein as well as the sealing rings 40 and the communication of the low pressure chamber beneath piston 28 with the conduit 154 provides a fluid-pressure means for responding automatically to an increase in the pressure acting on the high pressure piston 20 in order to immediately relieve the latter of pressure.

It is furthermore to be noted, as is apparent from FIGS. 1 and 2, that the major part of the pressure in the high pressure chamber 60 acts through the cup-shaped member 50 on the element 124 and on the cylinder 17 to provide absorption of the greatest part of the pressure in the chamber 60 by way of the plunger assembly 112 itself, the major part of the fluid under pressure in the chamber 60 pressing the member 124 against the flange 126 which is fixed to the plunger 12 and pressing the housing 10 upwardly with respect to the bolts 120 which fix it to the plunger 12, so that in this way most of the pressure in the chamber 60 is simply taken up by the plunger means 12. Only a small fraction of the pressure in the chamber 60 acts directly on the high pressure piston 20.

It is to be understood that the embodiments herein are shown merely for illustrative purposes and that the invention is not to be limited to these embodiments alone, but rather by the claims appended below.

What is claimed is:

1. An overload safety device for a press, comprising a movable low pressure piston, a high pressure piston fixedly connected to said low pressure piston and operatively connected to the press, a housing having a low pressure chamber for containing a fluid which contacts said low pressure piston, a high pressure chamber for containing a fluid which contacts said high pressure piston, means for sealing said low pressure chamber when the pressure on the fluid in said high pressure chamber is below a preset value, press turning off means, conduit means connecting said high pressure chamber to said press turning off means, whereby when the pressure on the fluid in said high pressure chamber exceeds a preset value, said low pressure piston moves to open said sealing means to expel said fluid from said low pressure chamber thereby releasing pressure on the fluid in said high pressure chamber, said press turn off means being responsive to said released pressure, said turn off means further comprising a second low pressure chamber, said second low pressure chamber being connected to said pressure chamber of said press by said conduit means.

2. The overload safety device according to claim 1, wherein said turn off means further comprises a second high pressure chamber connected to said high pressure chamber of said press.

3. The overload safety device according to claim 2, wherein said turn off means comprise a piston movable within said second high and said second low pressure chambers.

4. An overload safety device for a press, comprising a movable low pressure piston, a high pressure piston fixedly connected to said low pressure piston and operatively connected to the press, a housing having a low pressure chamber for containing a fluid which contacts said low pressure piston, a high pressure chamber for containing a fluid which contacts said high pressure piston, means for sealing said low pressure chamber when the pressure on the fluid in said high pressure chamber is below a preset value, press turning off means, conduit means connecting said high pressure chamber to said press turning off means, whereby when the pressure on the fluid in said high pressure chamber exceeds a preset value, said low pressure piston moves to open said sealing means to expel said fluid from said low pressure chamber thereby releasing pressure on the fluid in said high pressure chamber, said press turn off means being responsive to said released pressure, said high pressure piston and said low pressure piston being arranged in one piece.

5. An overload safety device for a press, comprising a movable low pressure piston, a high pressure piston fixedly connected to said low pressure piston and operatively connected to the press, a housing having a low pressure chamber for containing a fluid which contacts said low pressure piston, a high pressure chamber for containing a fluid which contacts said high pressure piston, means for sealing said low pressure chamber when the pressure on the fluid in said high pressure chamber is below a preset value, press turning off means, conduit means connecting said high pressure chamber to said press turning off means, whereby when the pressure on the fluid in said high pressure chamber exceeds a preset value, said low pressure piston moves to open said sealing means to expel said fluid from said low pressure chamber thereby releasing pressure on the fluid in said high pressure chamber, said press turn off means being responsive to said released pressure, said overload safety device being fixedly connected to said housing and that said high pressure piston, and said low pressure piston being movably arranged within said housing.

6. An overload safety device for a press, comprising a movable low pressure piston, a high pressure piston fixedly connected to said low pressure piston and operatively connected to the press, a housing having a low pressure chamber for containing a fluid which contacts said low pressure piston, a high pressure chamber for containing a fluid which contacts said high pressure piston, means for sealing said low pressure chamber when the pressure on the fluid in said high pressure chamber is below a preset value, press turning off means, conduit means connecting said high pressure chamber to said press turning off means, whereby when the pressure on the fluid in said high pressure chamber exceeds a preset value, said low pressure piston moves to open said sealing means to expel said fluid from said low pressure chamber thereby releasing pressure on the fluid in said high pressure chamber, said press turn off means being responsive to said released pressure, an annular main portion being arranged within said housing for receiving said low pressure chamber and said low pressure piston.

7. An overload safety device for a press, comprising a movable low pressure piston, a high pressure piston fixedly connected to said low pressure piston and operatively connected to the press, a housing having a low pressure chamber for containing a fluid which contacts said low pressure piston, a high pressure chamber for containing a fluid which contacts said high pressure piston, means for sealing said low pressure chamber when the pressure on the fluid in said high pressure chamber is below a preset value, press turning off means, conduit means connecting said high pressure chamber to said press turning off means, whereby when the pressure on the fluid in said high pressure chamber exceeds a preset value, said low pressure piston moves to open said sealing means to expel said fluid from said low pressure chamber thereby releasing pressure on the fluid in said high pressure chamber, said press turn off means being responsive to said released pressure, a movable cup-shaped member being connected within said housing and sealed relatively thereto.

8. The overload safety device according to claim 7, wherein a projection of said housing extends into said cup-shaped member and seals said high pressure piston.

9. The overload safety device according to claim 7, wherein said high pressure piston extends through an adapter piece mounted at the bottom of said cup-shaped member.

10. The overload safety device according to claim 3, further comprising a low pressure source communicating with said high pressure chamber and said low pressure chamber to produce a pressure in said second high pressure chamber of said turn off means.

11. The overload safety device according to claim 10, wherein said low pressure source actuates the liquid in said low pressure chamber as well as said piston of said turn off means.

12. An overload safety device for a press, comprising a movable low pressure piston, a high pressure piston fixedly connected to said low pressure piston and operatively connected to the press, a housing having a low pressure chamber for containing a fluid which contacts said low pressure piston, a high pressure chamber for containing a fluid which contacts said high pressure piston, means for sealing said low pressure chamber when the pressure on the fluid in said high pressure chamber is below a preset value, press turning off means, conduit means connecting said high pressure chamber to said press turning off means, whereby when the pressure on the fluid in said high pressure chamber exceeds a preset value, said low pressure piston moves to open said sealing means to expel said fluid from said low pressure chamber thereby releasing pressure on the fluid in said high pressure chamber, said press turn off means being responsive to said released pressure, said turn off means being fixedly connected to said housing.

13. The overload safety device according to claim 3, wherein said turn off means comprises a switching mechanism responsive to the movement of said piston of said turn off means.

14. In a press, plunger means for carrying out a working stroke while exerting pressure, high fluid pressure means coacting with said plunger means for detecting when a given pressure exerted thereby is exceeded, and low fluid pressure means coacting with said high fluid pressure means for automatically relieving the latter of substantially all of its pressure as soon as said given pressure is exceeded.

15. The combination of claim 14 and wherein both of said fluid pressure means respectively include high and low pressure pistons which are connected to each other for movement together, said low fluid pressure means including a chamber in which said low pressure piston is located with clearance around the periphery of said low pressure piston, means communicating with said chamber at one side of said low pressure piston therein for maintaining a predetermined low pressure acting on said low pressure piston at said one side thereof, sealing means in said low pressure chamber engaging the other side of said low pressure piston for sealing said other side thereof from said one side, and means communicating with the interior of said low pressure chamber at said other side of said low pressure piston for maintaining said other side of said low pressure piston substantially at atmospheric pressure, so that as soon as said pistons are displaced by an increase in the pressure of said high fluid pressure means, said low pressure chamber at said one side of said low pressure piston communicates with the part of said low pressure chamber at said other side of said low pressure piston for immediately relieving the pressure on both of said pistons.

16. The combination of claim 14 and wherein said high fluid pressure means includes a high pressure chamber containing a fluid at high pressure and transmitting the pressure of said fluid for the most part to said plunger means, said high fluid pressure means including a high pressure piston communicating with said high pressure chamber and receiving the pressure of only a fraction of the total pressure exerted by the fluid therein.

17. The combination of claim 16 and wherein said high pressure chamber includes an inner cylinder fixed to said plunger means, an outer cup-shaped member having a cylindrical side wall surrounding and slidably engaging said inner cylinder and having a transverse end wall distant from said inner cylinder and defining with the latter the major part of said high pressure chamber, a motion-transmitting member adapted to carry a tool of the press and against which said cup-shaped member is pressed by the fluid under pressure in said high pressure chamber, said motion-transmitting member itself being pressed against said plunger means, so that most of the pressure in said high pressure chamber is absorbed by said plunger means, and said high pressure piston being slidable in said cylinder and communicating with said high pressure chamber.

References Cited
UNITED STATES PATENTS 2,770,342   11/1956   Johansen _____ 192—150
2,872,886   2/1959   Longfield _____ 192—150 X MARK NEWMAN, *Primary Examiner.*

ARTHUR T. McKEON, *Examiner.*